Oct. 19, 1971　　　J. W. BAKER　　　3,613,243

CUTTING ROD

Filed Nov. 10, 1969

INVENTOR.
JESSE W. BAKER
BY Settle & Oltman

United States Patent Office 3,613,243
Patented Oct. 19, 1971

3,613,243
CUTTING ROD
Jesse Wade Baker, 122 Glen Parkway,
Hollywood, Fla. 33021
Filed Nov. 10, 1969, Ser. No. 875,318
Int. Cl. E01c *19/12*
U.S. Cl. 30—314                    3 Claims

ABSTRACT OF THE DISCLOSURE

A cutting rod which includes an elongated handle, an elongated hollow metal member attached to the handle and an elongated metal blade attached to the metal member.

BACKGROUND OF THE INVENTION

Field of the invention

This invention relates to a cutting rod used in shaping or trimming plastic surfaces such as fresh laid concrete or plaster or the like.

The prior art

Cutting rods used in shaping freshly applied concrete or the like have been long known in the art. One old type of cutting rod commonly comprises a metal blade and a wooden handle with the metal blade being fastened directly to the wooden handle by screws or other means. Wooden handles are commonly used with such tools because they are relatively more comfortable than metal and they provide good balance characteristics. The wood and metal have different expansion characteristics and the wood tends to warp with the passage of time so that the metal blade gets bent out of shape. This is undesirable since it is important that the metal blade be true throughout its length in order that a smooth, even surface can be obtained on the concrete or other material being shaped.

A new type of cutting rod has now been invented which eliminates the possibility of the blade being bent out of shape as a result of warping of the handle.

It is, therefore, an object of this invention to provide a new and improved cutting rod wherein the possibility of the metal blade being bent out of shape during use as a result of warping of a wooden handle is eliminated.

It is a further object of this invention to provide a cutting rod having an intermediate member between the blade and the wooden handle which has approximately the same coefficient of expansion as the blade, thus eliminating bending of the blade due to warping of the wooden handle of the cutting rod.

The foregoing and other objects and advantages of the invention will become apparent from the following description and accompanying drawings, in which FIG. 1 is a perspective view of the cutting rod of the invention;

DESCRIPTION OF THE PREFERRED EMBODIMENT

Figure 2:
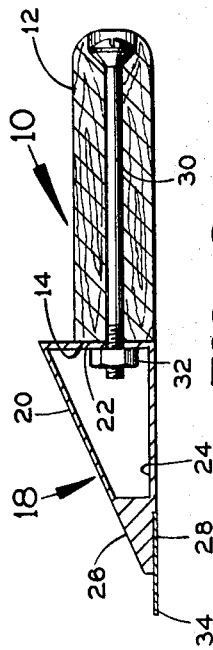
FIG. 2 is a view through the line 2—2 of FIG. 1.
Figure 3:
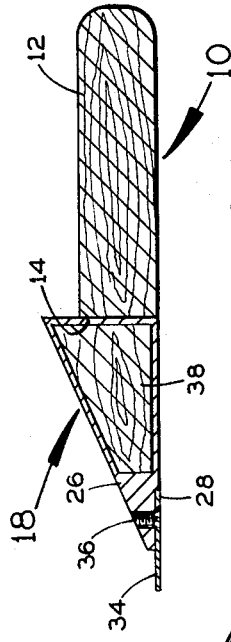
FIG. 3 is a view through the line 3—3 of FIG. 1.
Figure 1:
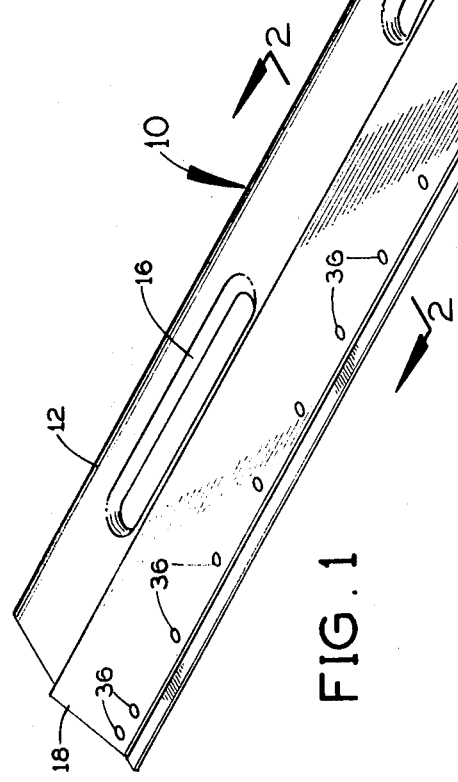
Figure 4:
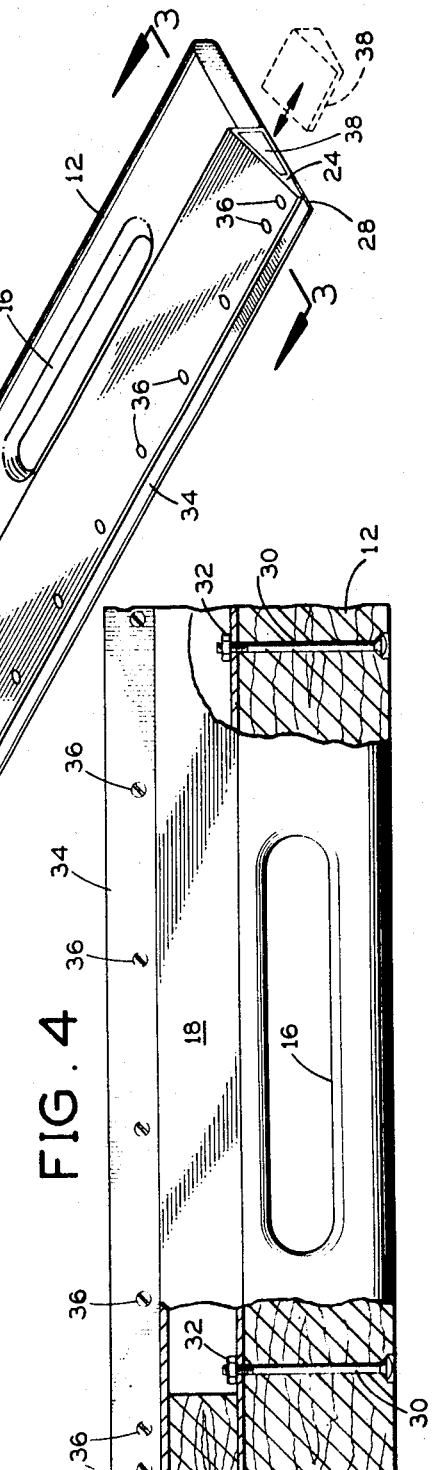
FIG. 4 is a bottom view with parts broken away and parts incross-section of a portion of the cutting rod of the invention.

The cutting rod 10 of this invention comprises a flat elongated handle 12 which is substantially rectangular in cross-section. The handle 12 has a vertical front face 14 and a plurality of slots 16 through which fingers may be inserted for gripping the handle 12. The handle is preferably wooden.

An elongated hollow metal extrusion 18 wedge-shaped in cross-section is attached to the front face 16 of the handle 12. The extrusion 18 has a sloping upper wall 20, a vertical side wall 22 and a horizontal lower wall 24. The included angle between the side wall 22 and the lower wall 24 is 90°. The extrusion has a solid section 26 at the forward end thereof and this section 26 is undercut on the underneath side 28 to provide a space for receiving a blade. The extrusion 18 is attached to the handle 12 by means of a plurality of bolts 30 which extend through the handle 12 and through the side wall 22 of the extrusion 18, and is secured by means of nuts 35 tightened against the inside of the side wall 22 of the extrusion 18.

An elongated metallic blade 34 is seated in the undercut portion 28 of the extrusion 18 and is fastened to the extrusion 18 by a plurality of screws 36.

The lower surfaces of the handle 12, extrusion 18 and the blade 34 are all on the same plane.

Wedges 38 are inserted in each end of the extrusion 18 to prevent concrete or other material being shaped from entering into the hollow interior of the extrusion 18.

The extrusion 18 has similar coefficient of expansion characteristics as compared to the metal blade 34. Preferably the extrusion 18 is made of aluminum or magnesium. The blade is preferably steel. By interposing the extrusion 18 between the blade 34 and the handle 12, distortion or bending of the blade 34 due to warpage of the handle 12 is eliminated. The blade thus maintains a straight edge which is desirable in its use for cutting and spreading.

I claim:

1. A cutting rod comprising an elongated, substantially flat handle which is substantially rectangular in cross-section, an elongated aluminum or magnesium extrusion attached to one side of said handle, said extrusion being a hollow, one-piece member which is triangular in cross-section, said extrusion having a solid nose portion with a recess on the underneath side thereof, and a flat elongated blade mounted in said recess and attached to said extrusion, the lower surfaces of said blade, said extrusion and said handle all being on the same plane.

2. The cutting rod of claim 1 wherein wedge-shaped blocks are inserted in each end of the hollow of said extrusion.

3. A cutting rod comprising, an elongated aluminum or magnesium extrusion in the form of a hollow, one-piece member which is triangular in cross-section and has a base side and forward sides converging at a nose of said extrusion having a solid portion with a recess on the underneath side thereof, a flat elongated blade mounted in said recess flush with one of said forward sides of said extrusion and attached to said nose, and a substantially flat handle which is substantially rectangular in cross-section attached to said base side of said extrusion by means of bolts having nuts inside said hollow interior of said extrusion, said handle and said one side of said extrusion and said blade all lying in the same plane.

References Cited

UNITED STATES PATENTS

| | | | |
|---|---|---|---|
| 400,590 | 4/1889 | Moore | 15—235.5 |
| 2,217,369 | 10/1940 | Jacobsen | 15—235.4 X |
| 2,608,852 | 9/1952 | Whalen | 15—235.4 |
| 3,018,499 | 1/1962 | Levy | 15—235.4 |

THERON E. CONDON, Primary Examiner

J. C. PETERS, Assistant Examiner

U.S. Cl. X.R.

15—235.5